(12) United States Patent
Haj-Yihia

(10) Patent No.: US 8,458,503 B1
(45) Date of Patent: *Jun. 4, 2013

(54) CONNECTED STANDBY SLEEP STATE

(75) Inventor: Jawad Haj-Yihia, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/535,809

(22) Filed: Jun. 28, 2012

Related U.S. Application Data

(63) Continuation of application No. 13/341,731, filed on Dec. 30, 2011, now Pat. No. 8,230,247.

(51) Int. Cl.
G06F 1/26 (2006.01)
G06F 1/32 (2006.01)
G06F 1/18 (2006.01)

(52) U.S. Cl.
USPC ........... 713/322; 713/300; 713/320; 713/323; 713/324

(58) Field of Classification Search
USPC .................. 713/300, 320, 322, 323, 324
See application file for complete search history.

(56) References Cited

U.S. PATENT DOCUMENTS

| | | | |
|---|---|---|---|
| 6,272,642 B2 | 8/2001 | Pole et al. | |
| 2004/0225907 A1 | 11/2004 | Jain et al. | |
| 2006/0047986 A1 | 3/2006 | Kurts et al. | |
| 2007/0157036 A1* | 7/2007 | Jahagirdar et al. | 713/300 |
| 2008/0072088 A1 | 3/2008 | Allarey et al. | |
| 2009/0256607 A1 | 10/2009 | Smith et al. | |
| 2009/0259863 A1 | 10/2009 | Williams et al. | |
| 2009/0259982 A1 | 10/2009 | Verbeure | |
| 2009/0292934 A1 | 11/2009 | Esliger | |
| 2010/0023788 A1 | 1/2010 | Scott et al. | |
| 2011/0078463 A1 | 3/2011 | Fleming et al. | |
| 2011/0179297 A1 | 7/2011 | Simmons et al. | |
| 2011/0296211 A1* | 12/2011 | Ramaraju et al. | 713/320 |

* cited by examiner

Primary Examiner — Vincent Tran
(74) Attorney, Agent, or Firm — Trop, Pruner & Hu, P.C.

(57) ABSTRACT

Power consumption and dissipation during sleep states of processors is reduced using a novel connected standby sleep state. In the connected standby sleep state a dedicated power plane is used to maintain processor context. To conserve power, unnecessary components on the processor are powered down, including all of the clock components, and wakeup sources previously directed to the processor are directed to a platform control hub. The platform control hub sustains certain architectural functions for the processor during connected standby sleep state, and manages the wakeup logic for returning the processor to the preceding sleep state.

20 Claims, 4 Drawing Sheets

CONNECTED STANDBY SLEEP STATE

This application is a continuation of U.S. patent application Ser. No. 13/341,731, filed Dec. 30, 2011 now U.S. Pat. No. 8,230,247, the content of which is hereby incorporated by reference.

TECHNICAL FIELD

The technical field is electronic systems and power management, particularly processor power management and processor sleep states.

BACKGROUND

As the trend toward advanced microprocessors, e.g. central processing units (CPUs), with more transistors and higher frequencies continues to grow, computer designers and manufacturers are often faced with corresponding increases in power and energy consumption. Particularly in mobile devices, such as laptop computers, wireless handsets, personal digital assistants, tablet computers, etc., increased power consumption can lead to overheating, which can negatively affect performance and significantly reduce battery life. Because batteries typically have a limited capacity, running the processor of a mobile device more than necessary could drain the capacity more quickly than desired.

To manage power consumption, today's high end CPUs have two distinct power-down modes—C-states and S-states. In C-states the CPU is put into sleep mode while maintaining context and appearing architecturally active to the system, also referred to as an idle state. In S-states the CPU is powered off and a boot process is required to restart it. Operating systems typically support a built-in power management software interface such as Advanced Configuration and Power Interface, (ACPI), an open industry specification standard first published in 1996, in which the CPU is placed into lower power sleep states based on reduced activity or demand. Among other aspects, the ACPI defines the lower power sleep states as a progression of C-states that can be supported by processors and/or chipsets.

For example, in ACPI, C0 is defined as the Run Time state in which the processor operates at high voltage and high frequency, C1 is defined as the Auto HALT state in which the core clock is stopped internally, C2 is defined as the Stop Clock state in which the core clock is stopped externally, and C3 is defined as a Deep Sleep state in which the Phase Locked Loops (PLLs) are shut down to turn off all processor clocks. In the C4 state, the voltage applied to a processor that is already in the C3 state is lowered to reduce leakage without jeopardizing state retention in the cores and caches.

Alternatively or in addition to ACPI, high end CPUs employ proprietary power management interfaces that define other C-states, referred to as enhanced C-states, in which different combinations of processor clocks are turned off and the processor voltage is reduced to a lower data retention point to achieve even deeper sleep states and greater reductions in power consumption. These additional sleep states are generally characterized by similar or equivalent semantics as the ACPI C-states, in which a higher numbered C-state generally consumes lower power than a lower numbered C-state, albeit with generally higher exit latencies.

A C-state can refer to the state of a single core. However, most modern processors are actually composed of several CPUs, such as the Intel Core Duo, which has 2 cores, or the Intel Core-2 Quad, which has 4 cores. Although each core has its own idle state, the multiple cores in a processor often share resources, such as the L2 cache or the clock generators. Therefore a processor generally can enter a particular C-state only if all of the cores in that processor are able to enter that C-state, sometimes referred to as a package C-state.

In operation, to enter the deeper sleep states, a power management interface typically detects a time slot in which there are no new or pending interrupts to the processor. The power management interface then uses an input/output (I/O) controller or other chipset feature to place the processor into the deeper sleep states. For example, entry into deeper sleep states is typically achieved by referencing an external voltage reference in a processor voltage regulator (VR) circuit and regulating to this reference voltage whenever a platform "Deeper Sleep" signal such as a DPRSLPVR signal or other similar signal is asserted by an I/O controller or other integrated circuit. The VR then transitions from a first voltage to a second lower voltage associated with the deeper sleep state including, for certain sleep states, a zero voltage. Upon exiting the deeper sleep state, the VR transitions back to a higher voltage within a specified time window.

After a processor has been placed into the deeper sleep state, a break event or interrupt from the operating system or another source may be sent to the chipset, and the chipset will then allow the processor to exit the deeper sleep state. The ability to transition between various power management states, including deeper sleep states, enables power consumption and dissipation to be reduced and battery life to be increased.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
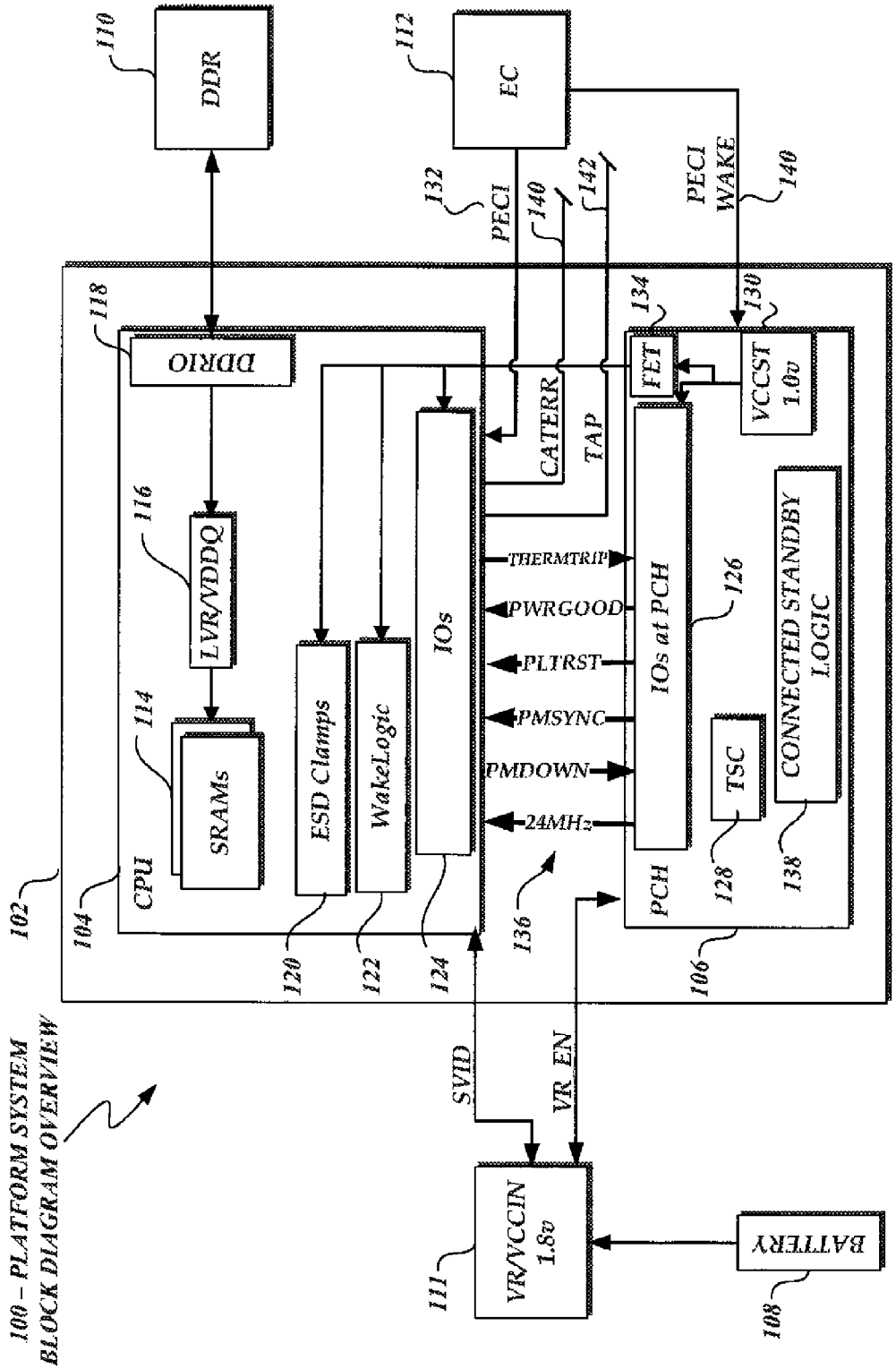
FIG. 1 is a block diagram of an exemplary platform system in which a processor can be placed into a connected standby sleep state according to one embodiment of the present invention.

In the description that follows, numerous specific details are set forth to provide a thorough explanation of embodiments of methods, media and systems for power management during sleep states of processors. The details are intended to facilitate an understanding of the invention through the description of exemplary embodiments of the invention. However, those details are not intended to limit the invention to the particular embodiments described. Variations and other embodiments are within the scope of the invention.

As will be apparent to one skilled in the art, an embodiment of the invention can be practiced without one or more of the specific details set forth in this description. In addition, certain well-known components, structures, and techniques have not been shown in detail so as to not obscure the understanding of the invention.

Certain details depicted in the figures, including details that comprise hardware (e.g. circuitry, dedicated logic, firmware, microcode, etc.), software (such as is run on a general-purpose computer system or a dedicated machine or device), or a combination of both, are provided for purposes of illustration. However, as will be apparent to one skilled in the art, hardware and/or software other than that which is depicted in the figures or described in the application may be employed in an embodiment while remaining within the scope of the invention.

Throughout the description, some of the details are set forth in terms of sequential operations. However, as will be apparent to one skilled in the art, some of the operations may be performed in a different order than described, including being performed in parallel rather than sequentially, while remaining within the scope of the invention.

Lastly, reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

Turning now to the detailed description, even with previous generations of deep sleep states, processors at a deep idle state still consume or leak power. This inefficient use of power can be due, at least in part, to one or more power planes remaining powered on during the sleep state in order to maintain processor context and for the processor to appear architecturally active to the system. Maintaining processor context and appearing architecturally active enables the processor to wake up quickly. The inefficiency occurs when some of the components supported by the power plane(s) that remain powered on are not needed.

For example, a processor in which embodiments of the invention may be employed is typically powered by an external voltage regulator (VR) and multiple internal voltage regulators that are integrated inside the processor die, referred to as fully integrated voltage regulators (FIVRs). The use of multiple FIVRs in the CPU die enables the grouping of components on the CPU die into separate power planes, such that power is regulated and supplied by the FIVR to only those components in the group. During power management, a given power plane of one FIVR may be powered down or off when the processor is placed into a certain C-state, while another power plane of another FIVR remains active, or fully powered.

In one embodiment, a sustain power plane, referred to as a VccST, is used during some deep sleep states to power on the I/O pins for several I/O signals, such as the interface between the CPU and the platform control hub (PCH), the interface with the external VR and the interface with an embedded controller (EC). The VccST also powers an on-die voltage regulator that supports the CPU static random access memory (SRAM) in which the CPU context is stored during the sleep state. The VccST is also used to power on the CPU's wakeup logic (WakeLogic) that monitors and processes the various wakeup source signals, such as the PMSYNC and PMDOWN serial interface between the PCH and the CPU. Lastly, the VccST power plane powers on the electrostatic discharge clamps (ESD Clamps) that reside on the CPU.

During power management, while other power planes such as the system agent power plane (VccSA) are powered down or off when the CPU enters certain deep sleep states, such as the package C-state C10 used in Intel® microprocessors, the VccST power plane remains powered on to support the above-referenced components. This can lead to unnecessary power consumption or dissipation when those components are not needed.

Among other advantages, embodiments of the present invention address this inefficiency. Specifically, embodiments of the present invention include methods, media and systems to manage power during sleep states of processors using a novel connected standby sleep state. In one embodiment, the connected standby sleep state maintains CPU context using a dedicated power plane. In one embodiment, the connected standby sleep state facilitates CPU wakeup using resources of the PCH. In one embodiment, the connected standby sleep state facilitates sustaining CPU architectural functions in the PCH until CPU wakeup. An embodiment of the invention advantageously enables turning off all of the unnecessary CPU components that were previously left powered on during deep sleep states, including turning off all of the clocks.

FIG. 1 illustrates a block diagram of an exemplary platform system in which a processor is placed into a connected standby sleep state according to one embodiment of the present invention. The platform system 102 can be a laptop computer, notebook computer, and electronic tablet or reading device, camera, personal digital assistant, wireless cellular telephone/handset, smart phone or any other type of mobile electronic system or mobile computing device. The platform system 102 can also be a stationary system such as a desktop or enterprise computing system. Other types of electronic systems are also within the scope of embodiments of the invention.

The platform system 102 is configured in accordance with an embodiment of the invention. The platform system 102 includes, among other components not illustrated so as not to obscure the invention, a CPU 104 and a PCH 106. In one embodiment, the CPU/processor 104 may be an Intel® architecture microprocessor including one or more processing cores and at least one execution unit to process instructions. It should be appreciated that any suitable number of processing cores may be utilized without departing from the scope of the embodiments described herein. In other embodiments, the processor 104 may be a different type of processor such as a digital signal processor, an embedded processor, or a microprocessor from a different source.

In one embodiment, the CPU 104 includes a DDRIO (Double Data Rate I/0) interface 118 to DDR 110, the DDRIO 18 coupled to an on die voltage regulator/supply LVR/VDDQ 116 that powers on one or more SRAMs 114 on the CPU. In the multiple core environments the CPU utilizes SRAMs 114 that function as a shared cache. For example, this shared cache may be a level 2 (L2) cache that is shared by the multiple processor cores.

In one embodiment, the CPU 104 also includes an I/O interface (IOs) 124 supporting various signaling protocols 136 between the CPU and the PCH 106 and between the CPU and the EC 112. The signaling protocols 136 include the 24 MHz clock signal, the PMDOWN/PMSYNC serial interface, the PLTRST platform restore signal, the PWRGOOD power good signal, and THERMTRIP, thermal trip signal. In one embodiment, the I/O interface 24 also supports debug signals for catastrophic error, CATERR 140 and a test access port, TAP 142. The CPU also contains the ESD clamps 120 and WakeLogic 122.

In one embodiment an external VR, VR/VCCIN 111 is powered by a battery 108, and interfaces with the platform system 102 via a serial voltage identification (SVID) interface to the CPU 104. The VR/VCCIN 111 interfaces with the PCH 106 via a voltage regulator enable signal VR_EN. An embedded controller (EC) 112 interfaces with the CPU 102 via a platform environment control interface (PECI) 132 and provides a PECI Wake 140 signal to the PCH 106 as needed.

In one embodiment, the PCH 106 also includes an I/O interface (IOs) 126 that supports the various signaling protocols 136 between the CPU and the PCH 106. In one embodiment, the PCH 106 contains a time stamp counter (TSC) 128 and connected standby logic 138 for controlling the system during the connected standby state. The integrated voltage regulator for the sustain power plane, the VCCST 130 resides on the PCH 106 as well.

In an embodiment, during operation of the platform system 102 in the connected standby state, the LVR/VDDQ 116 integrated voltage regulator functions as a dedicated power plane that remains powered on to support the dedicated cache memory (synchronous random access memory (SRAM)) 114 in which the CPU context is stored, i.e. the processor's critical state variables when the processor enters the deep sleep states and connected standby state. The critical state of the processor includes state variables associated with the architectural, micro-architectural, debug state, and/or similar state variables associated with that processor. Cache memories may be built into the processor's chip or packaged within the same housing as the processor chip.

In one embodiment, the sustain power plane, the VCCST 130, is coupled via an FET (Field Effect Transistor) 134 to power the IO interfaces for the PCH 106 and the CPU 104, 124 and 126 as well as the ESD Clamps 120 and WakeLogic 122. During transition to the connected standby state the VCCST 130 is powered down to reduce power consumption and dissipation by those components. The wakeup source signals (PECI Wake 140) from the EC 112 are sent to the PCH 106 instead of the CPU 104 during the connected standby state so that the PCH can manage the wakeup processing instead of the CPU. In addition, the TSC 128 is maintained in the PCH 106 to facilitate sustaining CPU architectural functions.

Figure 2:
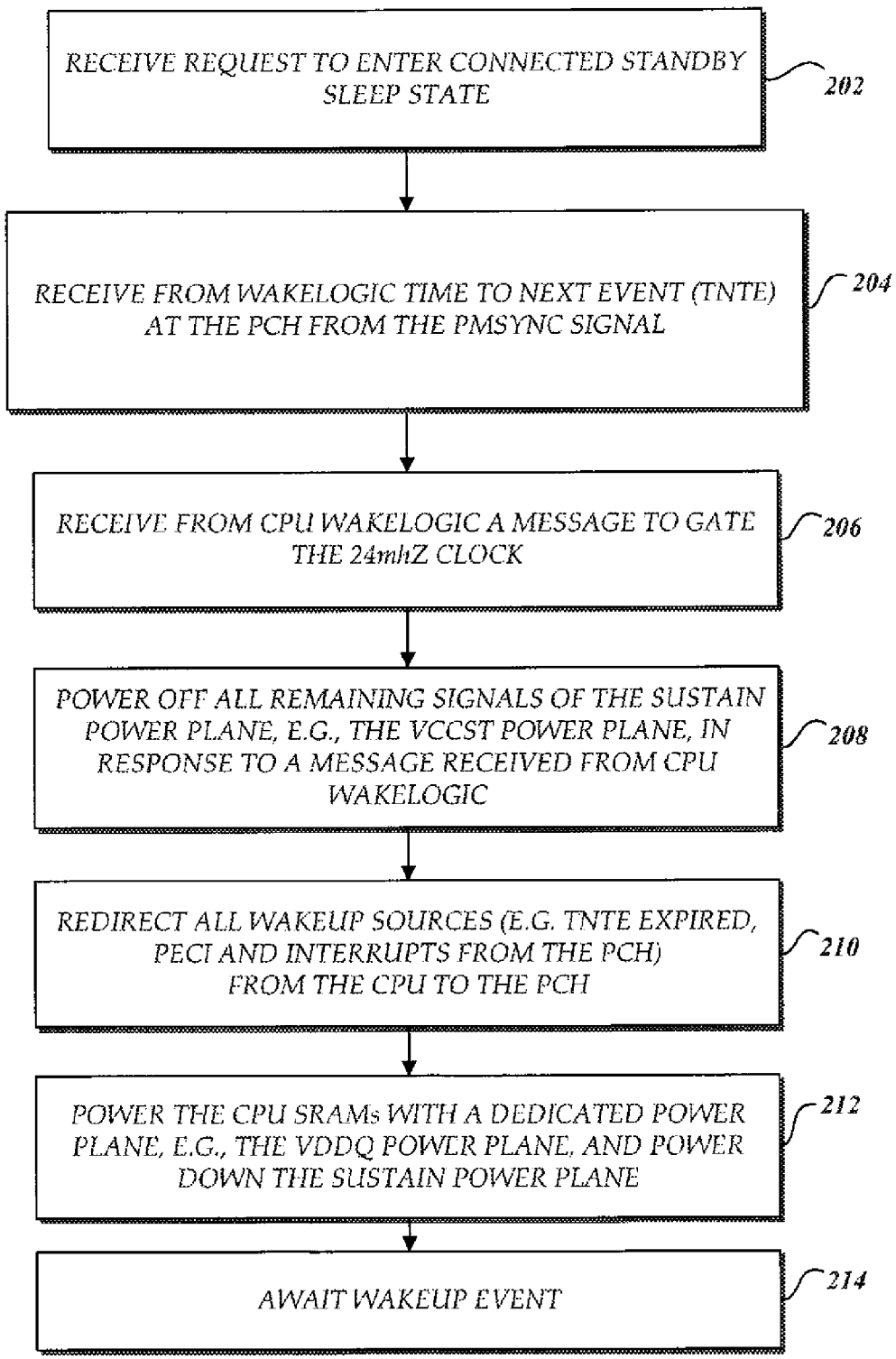
FIG. 2 is a flow diagram illustrating a process that may be utilized to enter into a connected standby sleep state, according to one embodiment of the present invention.
Figure 3:
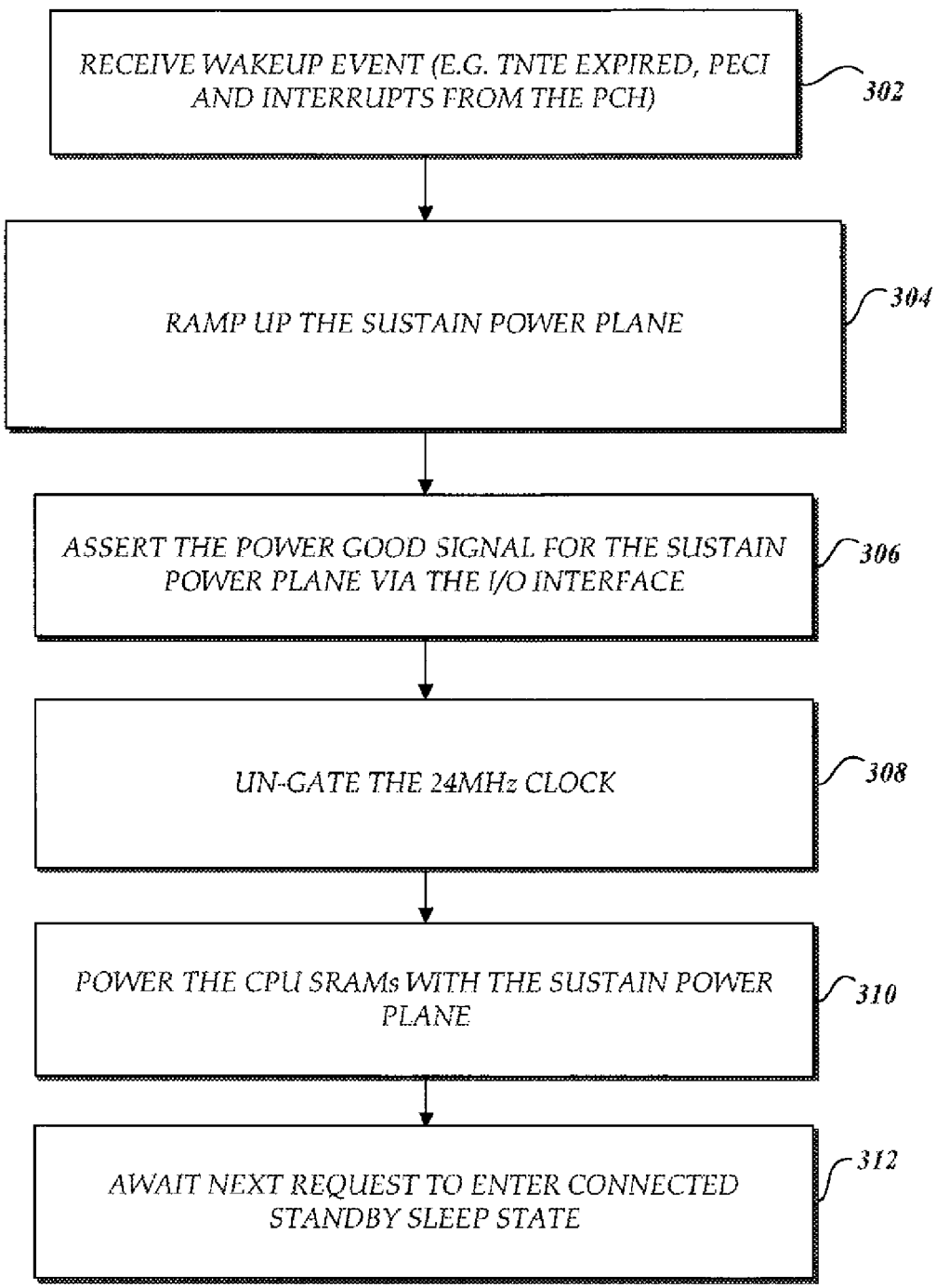
FIG. 3 is a flow diagram illustrating a process that may be utilized to exit out of the connected standby sleep state, according to one embodiment of the invention.

FIGS. 2 and 3 are flow diagrams illustrating processes 200 and 300 that may be utilized to enter into (200) and exit from (300) a connected standby sleep state, according to one embodiment of the present invention. With reference to FIG. 2, in order to enter the connected standby sleep state, an integrated circuit device such as a CPU, initiates a process 200 to ensure that each signal at the CPU 10 interface can be powered down, and that all of the wakeup sources can be moved to the PCH. Accordingly, at process block 202, after the CPU has entered a deep sleep state, such as the package C10 state in which a sustain power plane, e.g. the VccST, is used to power on a limited number of components in a platform system, the PCH receives a request to enter the connected standby sleep state. The request is received after a determination that the components supported by sustain power plane are no longer needed and the depth of the sleep state may be increased.

At process block 204, the WakeLogic component of the CPU sends a Time to Next Event (TNTE) signal to the PCH via the PMSYNC serial interface between the CPU and the PCH. At process block 206, the WakeLogic component of the CPU also sends a message to the PCH to gate the 24 MHz clock. This clock is a reference clock that typically remains powered on during the preceding deep sleep state (such as the C10 sleep state) in order to support the TSC (time stamp counter) and timer events in the CPU. Bur in the connected standby sleep state, the TSC is supported in the PCH, and timer events will also be handled by the PCH, so the 24 MHz clock is no longer needed.

At process block 208, the WakeLogic component of the CPU further sends a message to power down the sustain power plane, and turn off all of the remaining signals supported by the sustain power plane. Thus, the CPU IO's SVID interface to the external VR is turned off since the external VR will already be disabled or running in a limited state (in which the SVID interface is off but Wakeup Logic is maintained inside the external VR). Since the wakeup sources are moved to the PCH during the connected standby state, an interface to the external VR, even when running in a limited state, is not needed.

At process block 208, other remaining signals that are turned off include the PMSYNC/PMDOWN serial interfaces. These interfaces are used for communication between the CPU and the PCH and are no longer needed once the CPU is powered down. The PwrGood (power good) and PLTRST (platform reset) signals are used for communicating with other power plane domains in the platform system that are already powered down. The only other power plane domain that uses such signals is the power plane for the DDRIO that remains powered on in the connected standby state (the dedicated power plane), but the DDRIO will have its own PwrGood (power good) and PLTRST (platform reset) signals. Thus the PwrGood (power good) and PLTRST (platform reset) signals on the CPU IO interface are turned off since they are no longer needed.

At process block 208, since all the clocks are off and there is no sensor or logic that would generate a THERMTRIP signal from inside the CPU, the THERMTRIP signal is not functional and therefore turned off. The PECI interface was powered on during the preceding sleep states because it is a wakeup source. However, in the connected standby state, the PECI pin may be powered off and any PECI wakeup signals may be sent by the EC directly to the PCH via another interface, such as via the SMBUS. Lastly, certain debugging signals on the CPU's IO interface that were powered on during the preceding sleep states, such as the catastrophic error (CATERR) and test access point (TAP) signals may be turned off in the connected standby sleep state since there is no functional logic or clock functioning in the CPU that could be debugged with such signals.

In one embodiment, the enter process 200 continues at process block 210 in which all of the wakeup sources that were previously handled by the CPU are now redirected to the PCH. The wakeup sources include the expiration of the TNTE that was previously received at the PCH from the CPU WakeLogic, the redirection of the PECI wakeup signals from the EC, and any interrupts from the PCH.

In one embodiment, the enter process 200 continues at process block 212 in which the CPU SRAMs are powered on by the dedicated power plane, in this case the VDDQ power plane that powers on the CPU's DDRIO interface to the DDR device. In one embodiment, the voltage power management for the VDDQ may be set to a retention reference operating voltage by indicating to the VDDQ to ramp the operating voltage down with a particular voltage identification (VID) code. It should be noted that for some embodiments, the reference operating voltage may be a minimum retention operating voltage. Once the handoff to the VDDQ power plane is complete, the voltage power management for the VccST may be set to a lower or zero reference operating voltage by indicating to the VccST to ramp the operating voltage down with a particular voltage identification (VID) code. The result of process block 212 is that only a minimal set of components of the CPU are left powered on during the connected standby state, resulting in significant power savings over the preceding deep sleep states.

At process block 214 the enter process 200 concludes, the CPU is in the connected standby state, and the PCH awaits a wakeup or other timer event. In one embodiment, the PCH also maintains the TSC to sustain the CPU architectural functions during the connected standby state.

FIG. 3 is a flow diagram illustrating a process 300 that may be utilized to exit out of the connected standby sleep state, according to one embodiment of the invention. At process block 302, the PCH receives a wakeup event signal from one of the wakeup sources that were redirected to the PCH during the connected standby state. For example, the PCH may receive a notification of the expiration of the TNTE timer, or a PECI Wake signal from the EC, or an interrupt from the PCH itself.

In one embodiment, at process block 304, in response to receiving the wakeup event, the PCH proceeds to ramp up the sustain power plane, e.g. the VccST, that was previously powered down. For example, the voltage power management for the VccST may be set to a higher reference operating voltage by indicating to the VccST to ramp the operating voltage back up with a particular voltage identification (VID) code. It should be noted that for some embodiments, the reference operating voltage may be a minimum active state operating voltage. At process block 306, once the sustain power plane is sufficiently powered on and the corresponding pins are activated, the PCH asserts a PwrGood signal to the CPU via the IO interfaces between the PCH and the CPU.

At process block 308, the PCH then un-gates the previously gated 24 MHz clock. For example, the PCH relocks a phase lock loop (PLL) for the 24 MHz clock domain and turns the 24 MHz clock on.

In one embodiment, once the sustain power plane is powered on and the 24 MHz clock un-gated, the process 300 continues at process block 310 in which the PCH powers the CPU SRAMs with the sustain power plane, e.g. the VccST power plane, instead of the dedicated power plane, e.g. the VDDQ power plane. The processor state is returned to the preceding deep sleep state, such as the package C10 state. The process 300 concludes at process block 312 in which the PCH awaits the next request to enter a connected standby state.

In one embodiment, depending on the wakeup source, after the exit process 300 concludes control may be optionally transferred to the exit processes associated with the preceding deep sleep state, such as the package C10 state, so that those exit processes can restore the state of the CPU. For example, the state of the CPU is typically restored by generating a platform reset (PLTRST) signal to the CPU to perform an internal RESET to clear states and then restore the critical state variables associated with the CPU from the CPU SRAMs.

From the foregoing description it should be apparent that the novel connected standby state provides significant power savings for processors in a deep idle state. For example, the previous generation of deep sleep states left at least two power planes powered on and numerous other components of the processor powered on. In addition, the processor clock was left on to handle the processors' architectural and wakeup functions. By powering down components and shifting the architectural and wakeup functions to the PCH, use of the connected standby state is anticipated to save a significant amount of power, and be of particular benefit to mobile devices by extending battery life.

Figure 4:
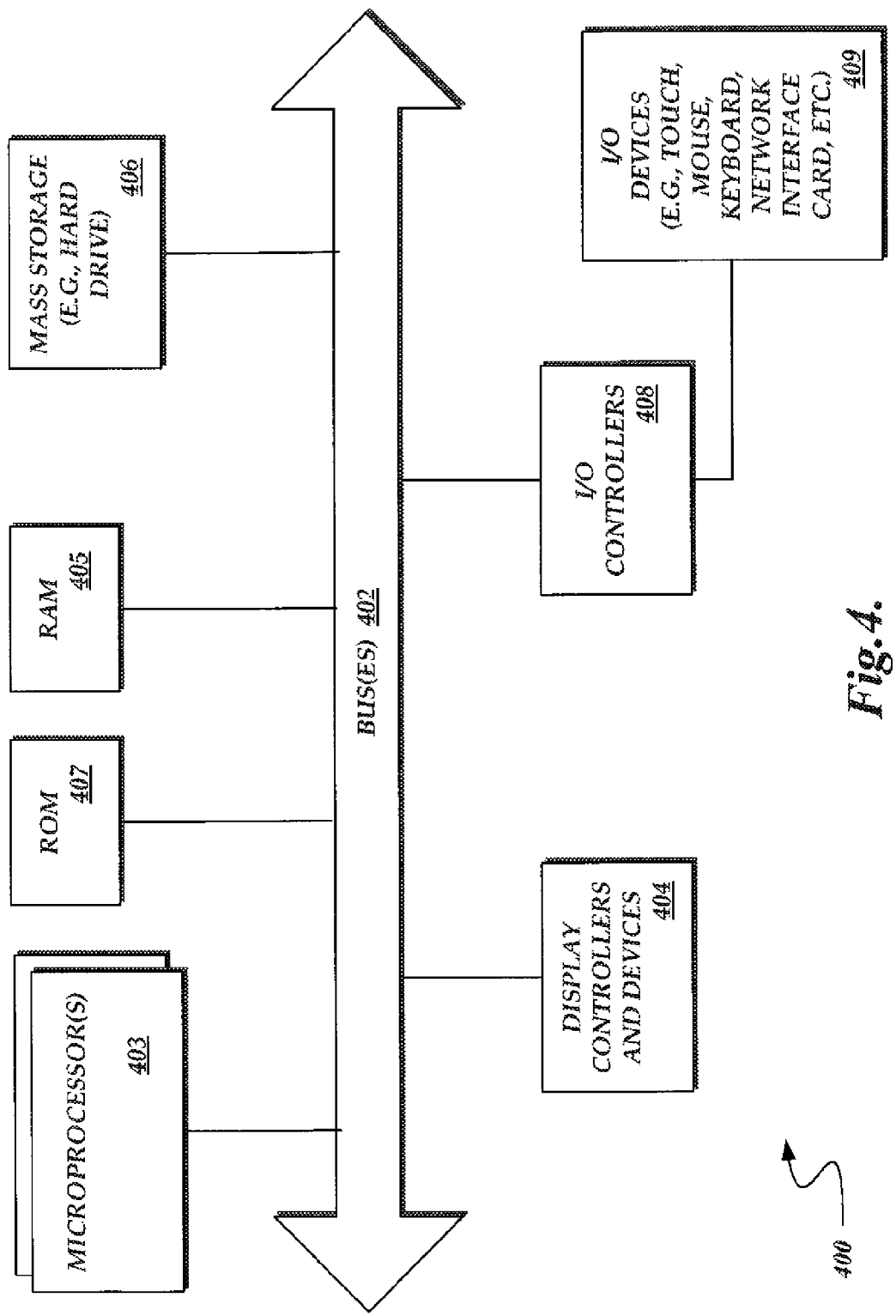
FIG. 4 illustrates an example of a typical computer system which can be used in conjunction with the embodiments described herein.

FIG. 4 illustrates an example of a typical computer system which can be used in conjunction with the embodiments described herein. Note that while FIG. 4 illustrates the various components of a data processing system, such as a computer system, it is not intended to represent any particular architecture or manner of interconnecting the components. It will also be appreciated that other types of data processing systems which have fewer components than shown or more components than shown in FIG. 4 could also be used with the present invention. The data processing system of FIG. 4 can be any type of computing device, such as a mobile or stationary computing and/or communication device including but not limited to a cell phone, smart phone, tablet computer, laptop computer, electronic book reader, desktop computer, digital camera, etc.

As shown in FIG. 4, the data processing system 400 includes one or more buses 402 which serve to interconnect the various components of the system. One or more processors 403 are coupled to the one or more buses 402 as is known in the art. Memory 405 can be DRAM or non-volatile RAM or can be flash memory or other types of memory. This memory is coupled to the one or more buses 402 using techniques known in the art. The data processing system 400 can also include non-volatile memory 407 which can be a hard disk drive or a flash memory or a magnetic optical drive or magnetic memory or an optical drive or other types of memory systems which maintain data even after power is removed from the system. The non-volatile memory 407 and the memory 405 are both coupled to the one or more buses 402 using known interfaces and connection techniques.

A display controller 404 is coupled to the one or more buses 402 in order to receive display data to be displayed on a display device 404 which can display any one of the user interface features or embodiments described herein. The display device 404 can include an integrated touch input to provide a touch screen. The data processing system 400 can also include one or more input/output (I/O) controllers 408 which provide interfaces for one or more I/O devices, such as one or more mice, touch screens, touch pads, joysticks, and other input devices including those known in the art and output devices (e.g. speakers). The input/output devices 409 are coupled through one or more I/O controllers 408 as is known in the art.

Where the system 400 is a mobile or portable system, a battery or battery connector may be included to provide power to operate the system 400 either exclusively or in the absence of another type of power source. Additionally, for some embodiments, an antenna may be included and coupled to the system 400 via, for example, a wireless local area network (WLAN) device to provide for wireless connectivity for the system 200. The wireless device may include a wireless communication module that may employ a Wireless Application Protocol to establish a wireless communication channel. The wireless communication module may implement a wireless networking standard such as Institute of Electrical and Electronics Engineers (IEEE) 802.11 standard, IEEE std. 802.11-1999, published 1999.

While FIG. 4 shows that the non-volatile memory 407 and the memory 405 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 402 may include one or more bridges or controllers or adapters to interconnect between various buses. In one embodiment, the I/O controller 408 includes a USB adapter for controlling USB peripherals and can control an Ethernet port or a wireless transceiver or combination of wireless transceivers.

It will be apparent from this description that aspects of the present invention could be embodied, at least in part, in software. That is, the techniques and methods described herein could be carried out in a data processing system in response to its processor executing a sequence of instructions contained in a tangible, non-transitory memory such as the memory 405 or the non-volatile memory 407 or a combination of such memories, and each of these memories is a form of a machine readable, tangible storage medium. In various embodiments, hardwired circuitry could be used in combination with software instructions to implement the present invention. Thus the techniques are not limited to any specific combination of hardware circuitry and software or to any particular source for the instructions executed by the data processing system.

All or a portion of the described embodiments can be implemented with logic circuitry such as a dedicated logic circuit or with a microcontroller or other form of processing core that executes program code instructions. Thus processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages could be used to implement the teachings of the invention as described herein.

In the foregoing specification, the invention has been described with reference to specific exemplary embodiments. It will be evident that various modifications could be made to the described embodiments without departing from the broader spirit and scope of the invention as set forth in the following claims. The specification and drawings are, accordingly, to be regarded in an illustrative sense rather than a restrictive sense.

What is claimed is:
1. A system comprising:
a processor coupled to a platform control hub, an external voltage regulator and an embedded controller, the processor having a sustain power plane including:
a cache memory in which a processor context is stored,
a wake logic to handle processor wakeup and context restore,
an input/output (I/O) interface between the processor and the platform control hub, the external voltage regulator and the embedded controller, and
an electrostatic discharge clamp;

wherein the processor is to enter a connected standby sleep state upon:
receipt of a timer signal from the wake logic;
gating of a clock operating in the processor;
powering of the cache memory with a dedicated power plane separate from the sustain power plane;
powering down of remaining components powered by the sustain power plane and powering down of the sustain power plane;
redirection of wakeup sources for handling processor wakeup and context restore to the platform control hub; and
transference of at least one architectural function of the processor to the platform control hub.

2. The system of claim 1, wherein the processor is to exit the connected standby sleep state upon the platform control hub:
receipt of a wakeup source;
powering up of the sustain power plane;
assertion of a sustain power good signal;
powering of the cache memory with the sustain power plane; and
ungating of the clock.

3. The system of claim 1, wherein the wakeup sources for handling processor wakeup and context restore include any one of:
a timer event;
a platform environment control interface wake signal; and
an interrupt occurring on the platform control hub.

4. The system of claim 3, wherein the timer signal received from the wake logic is a time to next event signal, and the timer event is an expiration of the time to next event signal.

5. The system of claim 1, wherein the I/O interface between the processor and the platform control hub is to support any one of a reference clock signal, a platform reset signal (PLTRST), a power good (PWRGOOD) signal, and a thermal trip signal (THERMTRIP).

6. The system of claim 1, wherein the I/O interface between the processor and the external voltage regulator is a serial voltage identification (SVID) interface.

7. The system of claim 1, wherein the I/O interface between the processor and the embedded controller supports a serial interface for power, thermal and error management.

8. The system of claim 1, wherein the I/O interface further supports debugging signals, including a catastrophic error signal and a test access port signal.

9. A method comprising:
transferring a cache memory storing a context of a processor in a deep sleep state to be powered from a sustain power plane of a platform control hub coupled to the processor to a dedicated power plane of the processor;
redirecting wakeup sources for the processor to the platform control hub;
powering down the sustain power plane;
gating a reference clock operating in the processor; and
awaiting an arrival of a wakeup source for the processor in the platform control hub.

10. The method of claim 9, further comprising responsive to the arrival of the wakeup source powering up the sustain power plane, returning the cache memory to the sustain power plane from the dedicated power plane, and ungating the reference clock.

11. The method of claim 9, wherein powering down the sustain power plane includes powering down:
interfaces between the processor and the platform control hub;
interfaces between the processor and an embedded controller; and
interfaces between the processor and an external voltage regulator.

12. The method of claim 11, wherein powering down the sustain power plane includes powering down:
an electrostatic discharge clamp; and
a wakeup component, wherein the functions of the wakeup component are temporarily maintained in the platform control hub when the sustain power plane is powered down.

13. The method of claim 11, wherein powering down the sustain power plane includes powering down:
debugging signals from the processor, the debugging signals including one or more of a catastrophic error signal and a test access port signal.

14. The method of claim 9, wherein wakeup sources for the processor includes any one or more of:
a timer event for a timer set based on a time to next event signal;
a platform environment control interface wake signal from an embedded controller; and
an interrupt occurring on the platform control hub.

15. The method of claim 9, further comprising powering a memory interface via the sustain power plane, the memory interface to interface to a memory coupled to the processor.

16. A processor comprising:
a cache memory to store a context of the processor in a deep sleep state;
a wake logic to handle a wake event for the processor, wherein responsive to entry into the deep sleep state, the processor is to:
transfer the cache memory to be powered from a sustain power plane of a platform control hub coupled to the processor to a dedicated power plane of the processor,
redirect wakeup sources for the processor to the platform control hub, and
power down the sustain power plane, and gate a reference clock to enable the platform control hub to await an arrival of at least one redirected wakeup source.

17. The processor of claim 16, wherein responsive to the arrival of the at least one redirected wakeup source, the platform control hub is to:
power up the sustain power plane;
return the cache memory to the sustain power plane from the dedicated power plane; and
ungate the reference clock.

18. The processor of claim 16, further comprising components to be powered by the sustain power plane comprising:
interfaces between the processor and the platform control hub;
interfaces between the processor and an embedded controller; and
interfaces between the processor and an external voltage regulator.

19. The processor of claim 16, further comprising components to be powered by the sustain power plane comprising:
an electrostatic discharge clamp; and
a wakeup component, wherein functions of the wakeup component are temporarily maintained in the platform control hub when the sustain power plane is powered down.

20. The processor of claim 16, wherein the dedicated power plane comprises an integrated voltage regulator coupled to the cache memory and further coupled to an interface to a memory.

* * * * *